May 4, 1954

J. L. AASLAND 2,677,377

HUSKING UNIT WITH EAR ALIGNER FOR CORN PICKERS

Filed Dec. 7, 1951

Inventor:
John L. Aasland
Paul O. Pippel
Atty.

May 4, 1954    J. L. AASLAND    2,677,377
HUSKING UNIT WITH EAR ALIGNER FOR CORN PICKERS
Filed Dec. 7, 1951    3 Sheets-Sheet 3

Inventor.
John L. Aasland
Paul O. Pippel
Atty.

Patented May 4, 1954

2,677,377

UNITED STATES PATENT OFFICE 2,677,377

HUSKING UNIT WITH EAR ALIGNER FOR CORN PICKERS

John L. Aasland, Moline, Ill., assignor to International Harvester Company, a corporation of New Jersey Application December 7, 1951, Serial No. 260,527

4 Claims. (Cl. 130—5)

This invention relates to a new and improved husking unit with ear aligner for corn pickers.

For many years corn pickers have been equipped with various types of husking means for the purpose of stripping husks from ears of corn that have been preliminarily snapped fro standing stalks. The degree of success in effecting removal of husks varies considerably depending upon the condition of the crop, the size of the ears of corn and the particular husking means employed to do the husk removing. The usual method of removing corn husks is by the utilization of a pair of cooperative rolls which are adapted to grasp by pinching the husk material and pulling the husks through the juncture between the cooperative rolls. These rolls used for husking have been made with numerous surface materials and with different forms of surface conformations in an effort to increase the husking ability of the rolls. Under certain conditions the husk material is easily grasped by the cooperative husking rolls, whereas under other conditions the husks present such a smooth surface to the rolls that it is difficult for the roll surfaces to grasp the husks. One important requirement in a husking unit is that the ears of corn to be husked have their longitudinal axes parallel to the longitudinal axes of the cooperative husk stripping rolls. In other words, if a relatively long ear of corn were to be placed transversely across cooperative husking rolls the husk would not be positioned sufficiently proximate to the juncture between the rolls so that the rolls could grip the husk and remove it from the ear of corn.

An important object of this invention is to provide a husking unit for corn pickers in which means is provided for properly aligning the ears of corn so that they lie with their longitudinal axes parallel to the axes of the cooperative husk stripping rolls.

Another important object of this invention is the provision of a husking unit for corn pickers having two pairs of cooperative husking rolls and means for dividing ears of corn delivered thereto into two portions and for delivering one portion of the ears of corn to one pair of rolls and the remaining portion of the divided ears of corn to the other pair of husking rolls.

Another and further important object of this invention is to supply a husking unit for corn pickers with a single conveyor mechanism for dividing the incoming ears of corn into two portions for delivery to separate cooperative husking rolls.

Still another important object of this invention is to provide an ear hold-down means for holding the ears of corn down against the cooperative husking rolls.

Another and still further important object of this invention is the provision of a single conveyor chain performing the several functions of carrying ears of corn and aligning them in a longitudinal manner, delivering the ears to cooperative husking rolls and simultaneously resiliently holding the ears down against the husking rolls during the husking operation.

A further object of this invention is to provide a stationary partition disposed over a single conveyor means whereby ears of corn discharged onto the husking unit will be divided into two relatively narrow portions and the ears aligned in a longitudinal manner for delivery to separate pairs of cooperating husking rolls.

Other and further important objects of this invention will become apparent from the disclosures in the following specification and accompanying drawings.

Figure 1:
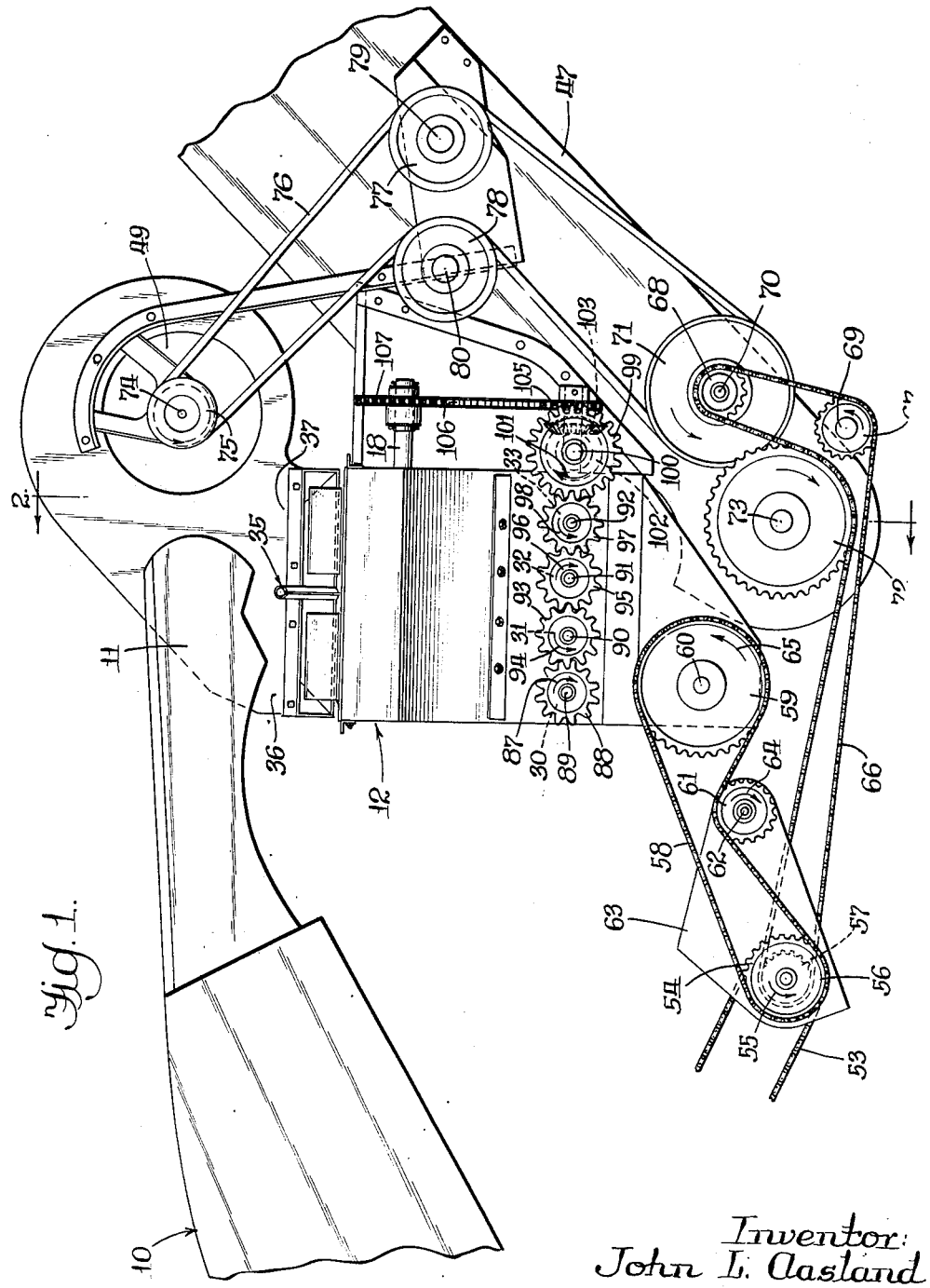
Fig. 1 is a side elevational view of a portion of a corn picker having the husking unit of this invention mounted thereon.

As shown in the drawings, the reference numeral 10 indicates generally a corn picker having a rearwardly extending delivery spout 11 for discharging snapped ears into a husking unit 12. The corn picker 10 is the type adapted to be mounted on an agricultural tractor whereby the implement may traverse a field of standing corn and strip or otherwise remove the ears of corn from the stalks and deliver them through the discharge spout 11 to the husking mechanism shown at 12.

The husking unit 12 comprises a housing 13 and a conveyor chain 14 mounted therein for endless movement about spaced apart sprockets 15, 16 and 17. These sprockets 15, 16 and 17 are mounted respectively on shafts 18, 19 and 20. The shafts 18 and 19 are journalled for rotation within the housing 13 of the husking unit 12. The shaft 20 is carried for journalled rotation on a bracket 21 which is capable of limited sliding movement within the housing 13. The forward end of the bracket 21 is provided with a longitudinally extending open end slot 22 which receives a cross pin 23 fixedly mounted within the housing 13. A spring element 24 is adapted to be anchored at 25 to the housing 13 and to exert a downward and lateral thrust at the attaching point 26 of the spring element 24 to the bracket 21. Thus the shaft 20 and its unitary sprocket 17 is urged downwardly and laterally away from the sprockets 15 and 16, thus maintaining the conveyor chain 14 constantly under tension.

Figure 3:
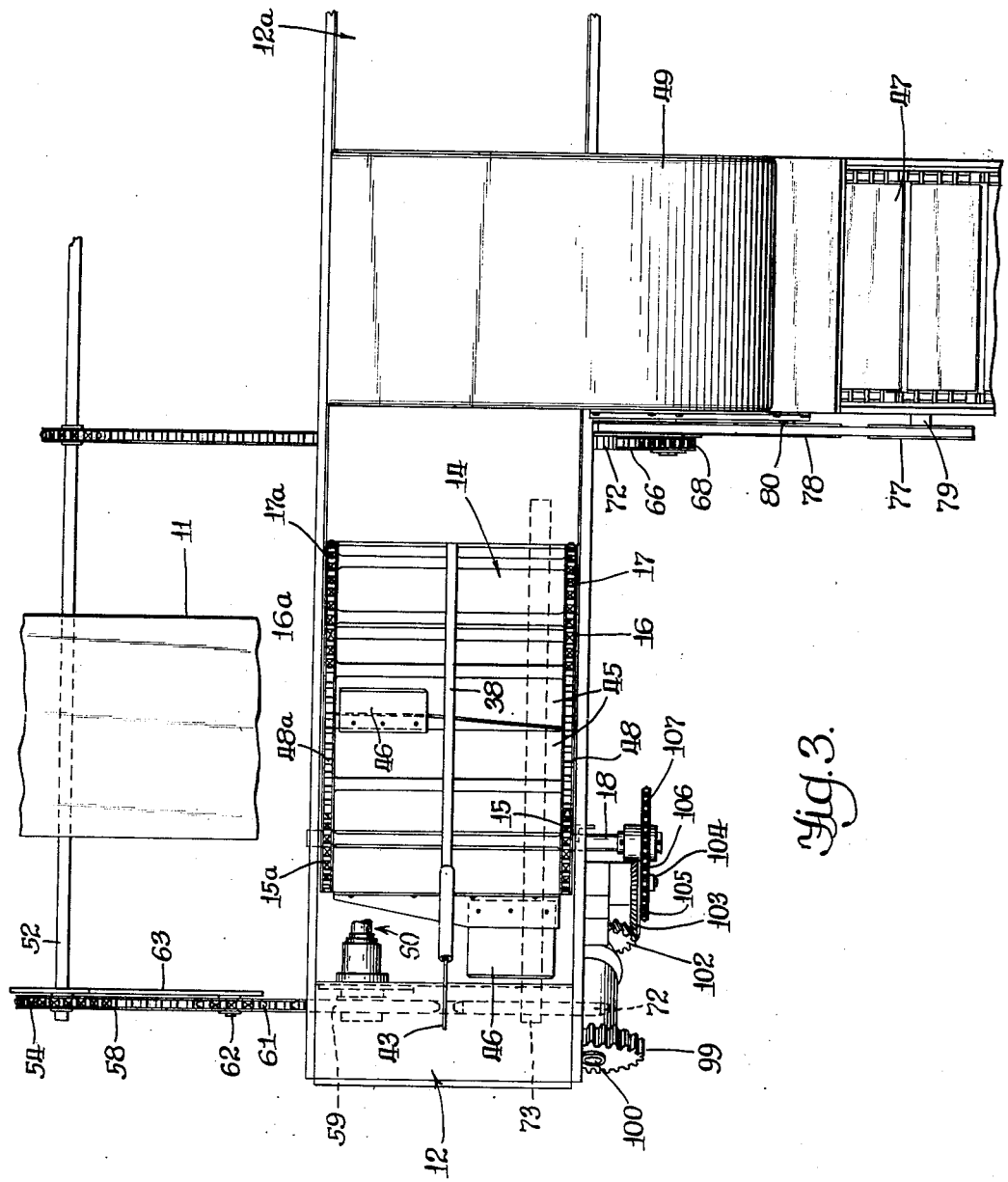
Fig. 3 is a top plan view of the device as shown in Figs. 1 and 2.

The husking unit further includes an upper ear corn-receiving bed 27 the floor of which is defined by the upper flight of the conveyor chain 14 and more particularly that portion of the conveyor chain lying between the sprockets 15 and 16. As best shown in Fig. 3, the conveyor chain 14 extends entirely across the length of the husking unit 12 and as indicated by the arrow 28 on the sprocket 15 and shaft 18, the conveyor chain moves in a direction laterally outwardly from the center of the corn picker.

The second important part of the husking unit 12 comprises the lower husking bed 29 lying beneath the lower flight of the conveyor chain 14. Two pairs of cooperative husking rolls are journally mounted within the housing 12 and all in the same plane which is disposed on an incline from a high position on the outside of the machine to a lower position centrally of the corn picker. These rolls are designated by the numerals 30, 31, 32 and 33. In order that the lower flight of the conveyor chain 14 runs substantially parallel to the inclination of the rolls 30, 31, 32 and 33, a curved guide element 34 is carried on the housing 13 and maintains the portion of the conveyor chain 14 nearest the sprocket 15 extended downwardly so that the conveyor chain 14 does not run in a straight line between the sprockets 15 and 17. As the ears of corn are dropped onto the upper bed 27 of the husking unit, they are divided fore and aft by a dividing partition member 35. The partition 35 defines a forward portion 36 of the upper bed 27 and a rearward portion 37 of the upper bed 27 of the husking unit 12. The partition includes a substantially horizontally disposed rod or rail 38 running laterally outwardly of the husking unit. The inner end of the rod 38 has a downwardly bent portion 39 which is anchored at 40 to a frame 41 carrying the husking unit of this invention on the rearward end of a corn picker. The lateral outward extension of the rod 38 comprises an upwardly bent portion 42 located adjacent the outer edge of the sprocket 15. A depending sheet 43 is carried by the upwardly bent portion 42 of the rod 38 and extends outwardly and thence downwardly in the form of a finger 44 beneath the sprocket 15 and the lower flight of the conveyor chain 14.

The conveyor chain 14 is provided with cross slats 45 and paddles 46. The paddles 46 are alternately spaced forwardly and rearwardly of the division member 38. The alternate spacing of the paddles 46 to the front and rear of the division member 38 transforms the single conveyor running laterally outwardly in the bed 27 into separate means for conveying ears of corn which are dropped onto the bed 27 from the discharge spout 11 of the corn picker. The division member 38 divides the incoming ears of corn into two portions, that is, the ears of corn that are carried by the forwardly disposed part of the conveyor 14 on the side 36 of the division member 38, and those ears which are carried by the rearwardly disposed portion of the conveyor 14 within the portion 37 of the bed 27. One end of an ear of corn drops onto the division member 38 and the other end lays on the chain conveyor 14. The intermittently spaced paddle members 46 will cause the end of the conveyor to be moved laterally outwardly and the rear portion of the ear of corn lying on the division member 38 will be pulled over on one side of the conveyor 14. The length of the bed portions 36 and 37 is sufficiently short or narrow so that a normal or average length ear of corn cannot lie lengthwise of the corn picking machine on the transversely running conveyor 14. It is therefore obvious that the narrow conveyor portions and the intermittently spaced paddles combine to align the ears of corn delivered thereto in a transverse direction with respect to the longitudinal travel of the corn picker or longitudinally of the direction of movement of the chain conveyor 14. The division member 38 and particularly the sheet partition portion 43 and its inwardly extending finger portion 44 prevents the intermixing of ears of corn from one portion of the conveyor 14 to the other. The forward portion 46 of the upper bed 27 is adapted to deliver aligned ears of corn to the cooperative inwardly and downwardly rotating husking rolls 30 and 31, whereas the rearward portion 37 of the upper bed 27 is adapted to deliver aligned ears of corn to the inwardly and downwardly rotating pair of husking rolls 32 and 33. The ears of corn are thus fed to the lower husking bed 29 in a direction longitudinally of the axes of the pairs of cooperative rolls 30 and 31, and 32 and 33. The alternately disposed paddles 46 positioned forwardly and rearwardly of the division member 38 perform the function of delivering the ears of corn laterally outwardly, as well as aligning and dislodging any cross ears in the upper bed 27, and simultaneously acts to hold the ears of corn for each of the pairs of rolls 30 and 31, and 32 and 33 down onto those pairs of rolls and particularly the junction therebetween for the purpose of effecting a husking of the ears of corn that are delivered to this husking unit. The cooperative husking rolls 30 and 31 and 32 and 33 are adapted to pull or otherwise strip the husks from the ears of corn and pull them downwardly therebetween whereafter the husks are discharged to the ground and the stripped ears of corn are fed by gravity laterally inwardly toward the center of the corn picker to a wagon elevator 47 which, as best shown in Fig. 1, is adapted to convey the snapped and stripped ears of corn upwardly and rearwardly for delivery to a trailing wagon or the like, not shown.

Figure 2:
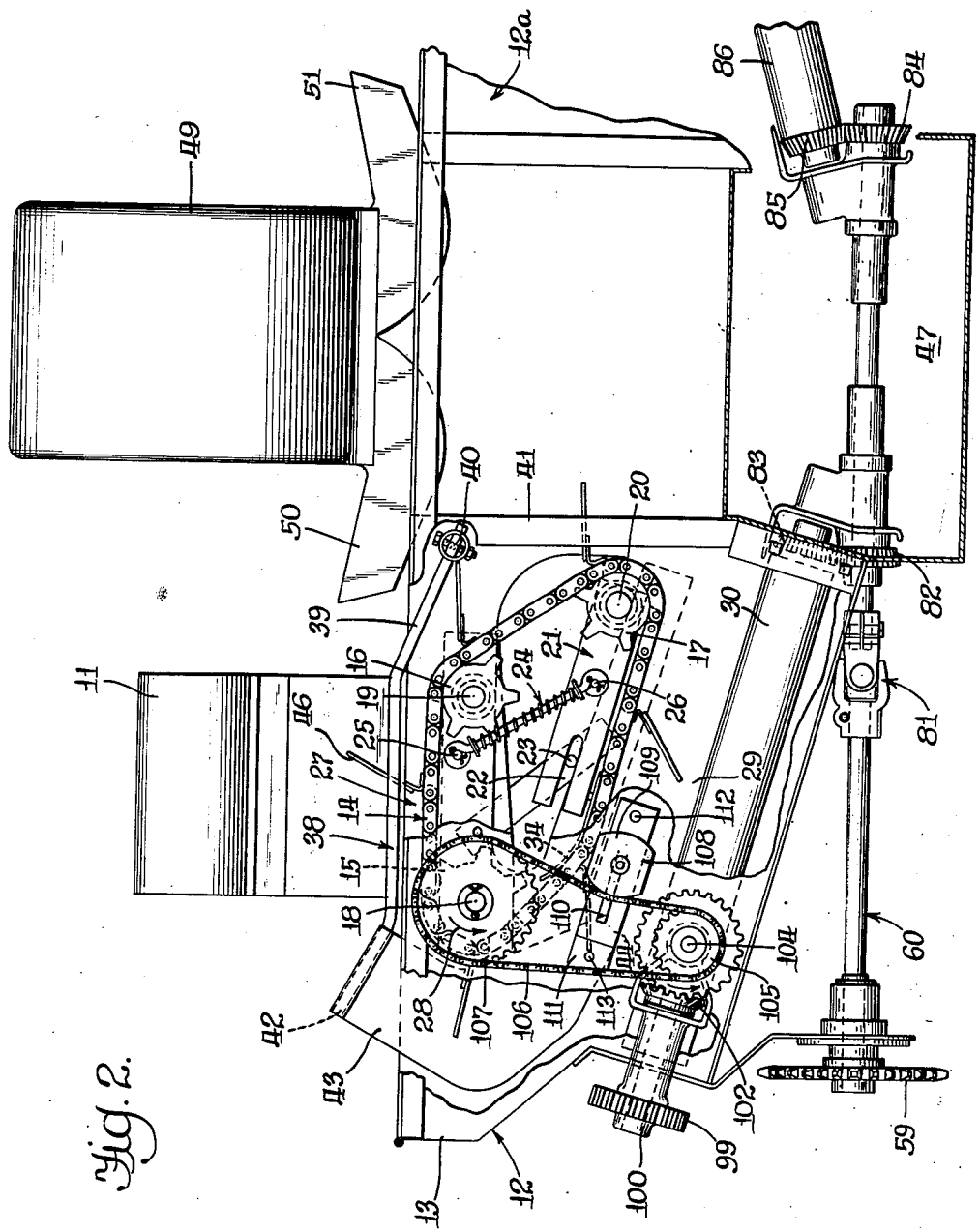
Fig. 2 is a sectional view taken on the line 2—2 of Fig. 1.

The chain conveyor 14 has substantial width and as shown in Fig. 3 is supported at both sides thereof by carrying sprockets. The sprockets shown in Fig. 2 are designated as Nos. 15, 16 and 17. For purposes of convenience, the sprockets carrying the other side of the conveyor chain 14 will be designated 15a, 16a and 17a. The chain conveyor cross slats 45 thus extend between the spaced sides 48 and 48a of the chain conveyor 14. Similarly the spring extension of the sprocket 17 is duplicated for the sprocket 17a and thus the entire conveyor 14 remains uniformly taut over its full surface. The spring extension means for the sprockets 17 and 17a further acts to yield upwardly upon the admission of an excessive number of ears of corn to the lower bed 29 of the husking unit. It is therefore apparent that the husking unit of this invention is capable of continuously receiving a plurality of snapped ears which are divided into two portions by reason of their falling on the receiving conveyor 14 whereupon the ears of corn on both front and rear portions of the conveyor are aligned transversely of the line of drive of the corn picker by reason of the dividing member 38 and the alternate and intermittently spaced conveyor paddle members 46 which extend upwardly beyond the upper edge of the divider rail 38. The ears thus received and aligned are thereafter passed separately to and with their long ends lying parallel to the longitudinal axis of the pairs of rolls 30 and 31, and 32 and 33. The paddles 46 hold the ears of corn down against the husking rolls at which time the husks are stripped from the ears and as previously stated, the stripped ears are delivered to the wagon elevator 47 and the husks are pulled through and out the bottom of the husking unit.

In order to eliminate unnecessary trash being delivered to the lower bed 29 of the husking unit, a blower 49 is provided at the rear of the corn picker and centrally thereof with laterally extending discharge spouts 50 and 51 which are directed over the top beds of spaced husking units. It should be understood that the corn picker of this invention may be a two-row picker wherein there are spaced apart discharge spouts, such as 11, for delivery of snapped ears of corn at spaced points rearwardly of the corn picker. As best shown in Fig. 2, the husking unit 12 is shown on one side of the corn picker and a portion of a duplicate husking unit 12a is shown on the other side of the longitudinal center line of the corn picker, thus the blower spouts 50 and 51 are adapted to deliver a blast of air over the upper beds of the husking units and through the falling ears of corn as they come from the delivery spout 11 of the corn picking unit. Any light trash material will thus be immediately discharged laterally at the side of the husking unit and will not be delivered along with the ears to be husked to the lower bed 29 of the husking unit.

As best shown in Fig. 1, drive for the various elements of the husking unit of this invention is received from a jackshaft 52 which is journally carried on the corn picker by suitable frame work, not shown. A chain 53 receives its power from a tractor power take-off (not shown). The chain imparts rotational drive to a sprocket 54 which is keyed or otherwise fastened to a jackshaft 52. The shaft 52 is rotated in the direction of the arrow 55. The shaft 55 is also equipped with sprockets 56 and 59 which rotate therewith. A chain 58 passes around the sprocket 56 and extends upwardly and rearwardly over a relatively large sprocket 59 mounted on a shaft 60 lying parallel to the jackshaft 52 and journalled within and beneath the husking unit 12. The idler sprocket 61 is adapted to engage the chain 58 and provide suitable tautness for the chain with resultant drive delivery from the jackshaft 52 to the main drive shaft 60 of the husking unit. The idler sprocket 61 is mounted on a stub shaft 62 carried on the corn picker framework 63. The idler sprocket rotates in the direction of the arrow 64 and similarly the large sprocket 59 of the main husking unit shaft 60 rotates in the direction of the arrow 65.

A chain 66 is driven by the sprocket 57 on the jackshaft 52 and delivers rotational drive rearwardly to conveyor means in the wagon elevator 47 and to the cleaning fan 49. The chain 66 extends around sprockets 67 and 68. The sprocket 67 is carried on a shaft 69 journalled beneath the wagon elevator 47. The sprocket 68 is carried by the shaft 70 which is journalled on the side of the wagon elevator 47 and similarly carries for rotation therewith a relatively large V belt pulley 71. The chain 66 engages a fourth sprocket 72 which is mounted on the main shaft 73 of the lower end of the wagon elevator. The cleaning fan 49 is mounted on a shaft 74 having a V belt pulley 75 mounted thereon. A V belt 76 is carried around the large V belt pulley 71 on the shaft 70 and by suitable intermediate V belt pulleys 77 and 78 the belt extends around the pulley 75 for direct drive of the cleaning fan 49. The pulley 77 is mounted on a stub shaft 79 which is carried on the side of the wagon elevator 47 and similarly the pulley 78 is carried on a stub shaft 80 supported on the wagon elevator structure.

The main husking unit drive shaft 60 is shown in Fig. 2 as including a universal joint 81 and a bevel gear 82 for delivery of rotational drive from the jackshaft 52 to the cooperative husking rolls 30, 31, 32 and 33. A bevel gear 83 is mounted at the lower end of the husking roll 30 and is in engagement with the bevel gear 82 on the shaft 60. Similarly a spaced-apart bevel gear 84 on the shaft 60 is adapted to engage a bevel gear 85 for imparting rotation to a roll 86 of the husking unit 12a. As best shown in Fig. 1 the roll 30 is driven in the direction of the arrow 87. A spur gear 88 is mounted on the other end of the roll 30. The roll 30 comprises a shaft 89 on which is carried a bevel gear 83, the husk engaging roll portion 30 and the spur gear 88. The roll shaft 89 is journally mounted for rotation within the housing 13 of the husking unit 12. Similarly the rolls 31, 32 and 33 are also equipped with central core members or shafts 90, 91 and 92 respectively. The shaft 90 carries a spur gear 93 for direct engagement with the spur gear 88 of the roll 30, and thus rotational drive is imparted from the roll 30 to a roll 31. The direct engagement of the spur gears 88 and 93 causes the roll 31 to rotate in the direction of the arrow 94, and thus the inwardly extending surfaces between the rolls 30 and 31 both run downwardly from the top to bottom, thus providing means for pinching the husks at the juncture between the rolls and stripping the husks by downward pulling thereon. The shaft 91 carries a spur gear 95 which engages the spur gear 93 for rotation of the gear 95 and roll 32 in the direction indicated by the arrow 96. The shaft 92 is provided with a spur gear 97 and it engages the spur gear 95 with a resultant rotational direction as indicated by the arrow 98. It will thus be seen that the pair of rolls 32 and 33 provide for a downwardly moving surface between the rolls from top to bottom in the same manner as the pair of rolls 30 and 31.

The spur gear 97 is in engagement with another spur type gear 99 of somewhat larger diameter. The gear 99 is carried on a shaft 100 and the gear and shaft are rotated in the direction of the arrow 101 by reason of the engagement with the spur gear 97. The shaft 100 is journally mounted in the housing 13 of the husking unit and, as best shown in Figs. 2 and 3, has a bevel gear 102 spaced laterally inwardly of the large spur gear 99. The bevel gear 102 is in meshing engagement with a bevel gear 103 positioned at right angles thereto and carried on a shaft 104. The shaft 104 is a stub shaft mounted on the side of the husking unit housing 13. A sprocket 105 is mounted on the shaft 104 and rotates simultaneously with the rotation of the bevel gear 103. A chain 106 is adapted to deliver rotational movement from the shaft 104 to the shaft 18 carrying the sprockets 15 and 15a of the conveyor mechanism 14. The chain 106 extends around the sprocket 105 on the shaft 104 and around a sprocket 107 on the shaft 18. An adjustable chain tightener mechanism is shown at 108 wherein a tightener block 109 is movable toward and away from the chain 106 within an elongated slot 110 in a carrier bracket 111. The bracket 111 is fastened to the husking unit housing 13 by means of pulleys or the like 112 and 113.

It will thus be seen that herein is provided a husking unit for attachment to a field traversing corn picker wherein the ears of corn are snapped from the stalks and delivered to the husking unit through a discharge spout 11. The ears of corn drop in an irregular manner onto the top bed 27 of the husking unit, as defined by the upper flight of the conveyor 14. The ears are separated into two portions, namely, to the front and rear of the dividing rail 38. The narrowness of each portion of the single conveyor combined with the alternate and intermittent spacing of the paddle flights 46 which extend upwardly above the dividing rail 38 and align the irregularly dropped ears so that they are delivered lengthwise or with their longitudinal axes parallel to the longitudinal axes of the pairs of husking rolls forming the lower bed 29 of the husking unit. The conveyor 14 with its integral paddles 46 act to deliver the ears laterally outwardly across the top of the husking unit and thus downwardly and inwardly over the cooperative husking rolls. The paddles 46 of the conveyor 14 hold the ears downwardly against the husking rolls insuring the removal of the husk from the ears of corn. As explained, the lower flight of the conveyor 14 is yieldable upwardly to accommodate various numbers of ears of corn to be husked.

Numerous details of construction may be varied throughout a wide range without departing from the principles disclosed herein, and I therefore do not propose limiting the patent granted hereon otherwise than as necessitated by the appended claims.

What is claimed is:

1. A husking unit comprising a housing, a slatted chain conveyor in said housing, the upper flight of said conveyor defining an upper bed for receiving ears of corn to be husked, cooperative husking rolls in said housing defining a lower bed positioned beneath said upper bed a substantial distance, the lower flight of said conveyor spaced above and running longitudinally of said lower bed of husking rolls, said conveyor adapted to receive ears of corn in the upper bed and deliver them to and carry them down and over the lower bed, a rail divider member disposed above said conveyor in the upper bed and extending longitudinally of the conveyor whereby the conveyor and upper bed are effectively divided into two corn receiving portions, and a partition forming a continuation of said rail divider member and extending around the end of the conveyor from the upper bed to the lower bed.

2. A device as set forth in claim 1 in which the width of each portion of the conveyor and upper bed is less than the average length of ear of corn.

3. A device as set forth in claim 2 in which relatively narrow intermittently spaced paddles are provided for said conveyor, said paddles alternately positioned on one side of said rail divider member and the other side of said rail divider member whereby ears of corn delivered to said upper bed and lying across said rail divider member are definitely forced in either of the portions of the upper bed and disposed longitudinally of said conveyor.

4. A device as set forth in claim 3 in which there are two pairs of cooperative husking rolls, and one pair of said cooperative husking rolls being in alignment with one of the portions of said upper bed.

References Cited in the file of this patent

UNITED STATES PATENTS

| Number | Name | Date |
|---|---|---|
| 584,889 | Packer | June 22, 1897 |
| 750,642 | Hall | Jan. 26, 1904 |
| 754,158 | Pitkin | Mar. 8, 1904 |
| 768,166 | Barnard | Aug. 23, 1904 |
| 808,264 | Vandegrift | Dec. 26, 1905 |
| 915,934 | Butler et al. | Mar. 23, 1909 |
| 1,121,938 | Morral | Dec. 22, 1914 |
| 2,080,717 | Hitchcock | May 18, 1937 |